(12) United States Patent
Kudoh (10) Patent No.: US 7,680,660 B2
(45) Date of Patent: Mar. 16, 2010

(54) VOICE ANALYSIS DEVICE, VOICE ANALYSIS METHOD AND VOICE ANALYSIS PROGRAM

(75) Inventor: Hirokazu Kudoh, Tokyo (JP)

(73) Assignee: Sega Corporation, Tokyo (JP)

( * ) Notice: Subject to any disclaimer, the term of this patent is extended or adjusted under 35 U.S.C. 154(b) by 1392 days.

(21) Appl. No.: 11/060,754

(22) Filed: Feb. 18, 2005

(65) Prior Publication Data

US 2005/0192805 A1 Sep. 1, 2005

(30) Foreign Application Priority Data

Feb. 26, 2004 (JP) ............... 2004-051998

(51) Int. Cl.
*G10L 15/00* (2006.01)
(52) U.S. Cl. ..................................... 704/248
(58) Field of Classification Search ................ 704/200, 704/205, 206, 216, 248
See application file for complete search history.

(56) References Cited

U.S. PATENT DOCUMENTS

| 5,109,418 | A | | 4/1992 | Van Hemert | |
|---|---|---|---|---|---|
| 5,657,426 | A | * | 8/1997 | Waters et al. | 704/276 |
| 5,689,618 | A | * | 11/1997 | Gasper et al. | 704/276 |
| 5,878,396 | A | * | 3/1999 | Henton | 704/276 |

FOREIGN PATENT DOCUMENTS

| JP | 58-148443 | 9/1983 |
|---|---|---|
| JP | 61-100956 | 5/1986 |
| JP | 04-263298 | 9/1992 |
| JP | 6-32007 | 4/1994 |
| JP | 6-46360 | 6/1994 |
| JP | 3081108 | 6/2000 |
| JP | 2000-324499 | 11/2000 |
| JP | 2002-108382 | 4/2002 |
| JP | 2002-215180 | 7/2002 |
| JP | 2003-233389 | 8/2003 |

OTHER PUBLICATIONS

F. Brugnara, et al., *Automatic segmentation and labeling of speech based on Hidden Markov Models*, 1993, Elsevier Science Publishers B.V.
Jordan R. Cohen, *Segmenting speech using dynamic programming*, J. Acoust. Soc. Am. 69 (5), May 1981.

* cited by examiner

*Primary Examiner*—Angela A Armstrong
(74) *Attorney, Agent, or Firm*—Dickstein Shapiro LLP (57) ABSTRACT

A voice analysis method and device are provided whereby processing can be performed in real time and an indefinitely large number of speakers can be coped with. A computer-executable method of voice analysis is for detecting boundaries of phonemes from input voice, and is characterized by repeating a step of specifying a time-point in an input voice signal, a step of extracting the voice signal contained in a time range of prescribed length from this time-point, and a step of decomposing the extracted voice signal into frequency component data; finding a plurality of frequency component data from the voice signal contained in time ranges of the prescribed length; finding a plurality of correlations using the frequency component data corresponding to the voice signal contained in mutually adjacent time ranges of the prescribed length; finding time ranges having a degree of change that is larger than the two adjacent degrees of change on either side thereof; and partitioning the input voice signal into a plurality of sections based on these time ranges.

13 Claims, 10 Drawing Sheets

VOICE ANALYSIS DEVICE, VOICE ANALYSIS METHOD AND VOICE ANALYSIS PROGRAM

BACKGROUND OF THE INVENTION

1. Field of the Invention

The present invention relates to a voice analysis device, voice analysis program and voice analysis method. In more detail, it relates to an image-generating device employing a voice analysis method according to the present invention and, in particular, to a lip synch animation image generating device that creates animation (lip synch animation) whereby the shape of the mouth is changed in accordance with voice.

2. Description of the Related Art

Voice analysis technology is currently employed in various fields. Examples are identifying a speaker by voice, converting voice into text, or generating lip synch animation whereby the shape of the mouth is varied in accordance with voice. The processing that is performed in these cases respectively involves: in the case of voice analysis technology, extraction of phonemes, i.e. the units that are employed to a distinguish meaning of words, from voice; in the case of speaker identification, identification of a speaker using the degree of similarity between extracted phonemes and reference patterns registered beforehand; in the case of text conversion, displaying letters corresponding to the extracted phonemes on a display or the like; and, in the case of creation of lip synch animation, displaying an image corresponding to the extracted phoneme on a display or the like.

The prior art includes the following methods of extracting phonemes from voice. For example, in the speaker identification system disclosed in Published Japanese Patent No. H6-32007, phonemes are extracted by determining, for each vowel, intervals such that the distance between a previously input reference pattern and the voice of the speaker is less than a prescribed value and establishing a correspondence between these intervals and the vowels.

Such intervals for extracting phonemes are called segments. In the animation image generating device of Laid-open Japanese patent application No. 2003-233389, a formant analysis using for example a Composite Sinusoidal Modeling (CSM) is conducted and phonemes are extracted based on formant information to characterize vowels.

SUMMARY OF THE INVENTION

However, in order to perform determination of segments using the distance from a reference pattern, a database in which reference patterns are registered for each speaker must be prepared. However, this inevitably results in an enormous quantity of data, depending on the number of speakers, extending the processing time required for voice analysis. It is therefore difficult to apply this to situations in which real-time processing is required (such as for example creating lip synch animation). Also, when a new speaker is enrolled, the task arises of adding the reference patterns of the new speaker to the database; the task of managing the database therefore becomes burdensome and the system is difficult to apply to an indefinitely large number of speakers.

Also, the present situation is that in fact extraction of phonemes using formant information is difficult to apply to situations where real-time processing is required, due to the time required for such processing. Apart from these, a phoneme extraction method is known utilizing for example LPC (Linear Predictive Coding) cepstrum analysis. It is found that the accuracy of phoneme extraction using this method increases as the number of times of repetition increases i.e. there is a learning effect. Conversely, in order to raise the accuracy of the extraction, it is necessary to prepare analysis results for a large number of learning signals beforehand; it is therefore difficult to apply this method to an indefinitely large number of speakers.

In addition, it is known that the character of the spectral envelope varies considerably depending on the method of representation or method of extraction affected by such as determination of degree or number of repetitions, and skill on the part of the analyst is therefore required.

An object of the present invention is therefore to provide a voice analysis device and voice analysis method whereby real-time voice analysis processing can be performed and that is capable of application to an indefinitely large number of speakers, without needing to prepare reference patterns for each speaker. A further object is to provide an animation image-generating device capable of real-time processing by applying this voice analysis method.

According to a first aspect of the present invention, the above objects are achieved by providing a computer-executable method of voice analysis which detects boundaries of phonemes from input voice, includes: a first step specifying a time-point in said input voice signal; a second step extracting the voice signal contained in a time range prescribed length from said time-point; and a third step of decomposing said extracted voice signal into frequency component data, wherein n frequency component data extracted from the voice signal contained in n time ranges of said prescribed length are found by repeating said first, second and third steps n times (where n is a natural number of at least 6) for each prescribed time; (n−1) correlations are found from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length; (n−2) said degrees of change are found from the (n−1) said correlations, by finding the k-th degree of change based on the k-th correlation and said (k+1)-th said correlation (where k is a natural number of at least 1 and not greater than (n−2) when m is defined as the number specifying the degree of change that is larger than two degrees of change adjacent to the specified degree of change in the (n−2) degrees of change from the first to the (n−2)-th, namely m satisfying the condition that the m-th degree of change is larger than the (m−1)-th degree of change and is larger than the (m+1)-th degree of change when m is changed one at a time from 2 to (n−3), the defined number m is found; a time range of said prescribed length is specified in accordance with the defined number m; and said input voice signal is partitioned into a plurality of sections in accordance with said specified time ranges.

According to a second aspect of the present invention, the above objects are achieved by providing a method of voice analysis according to the first aspect, further has: calculating characteristic quantities for each section of said partitioned voice signals and specifying said phonemes of said sections by comparing said characteristic quantities with reference data for each said phoneme.

According to a third aspect of the present invention, the above objects are achieved by providing a method of voice analysis according to the first aspect wherein the prescribed time is shifted for the time range of said prescribed length to form mutual overlapping portions.

According to a fourth aspect of the present invention, the above objects are achieved by providing a method of voice analysis according to the first aspect wherein said correlation is a value obtained by summing the products of amplitudes corresponding to the same frequency components.

According to a fifth aspect of the present invention, the above objects are achieved by providing a method of voice analysis according to the first aspect wherein said frequency component data is found by Fourier transformation of frequency components of said extracted voice signal.

According to a sixth aspect of the present invention, the above objects are achieved by providing a method of voice analysis according to the second aspect wherein said characteristic quantities are determined in accordance with an amplitude of each frequency component obtained by Fourier transformation of said voice signal contained in the section of said partitioned voice signal obtained by said partitioning.

According to a seventh aspect of the present invention, the above objects are achieved by providing computer-executable method of animation image generation which displays an image corresponding to partitions of phonemes from an input voice signal, comprising: a first step specifying a time-point in said input voice signal; a second step extracting the voice signal contained in a time range of prescribed length from said time-point; and a third step decomposing said extracted voice signal into frequency component data, wherein n frequency component data extracted from the voice signal contained in n time ranges of said prescribed length are found by repeating said first, second and third steps n times (where n is a natural number of at least 6) for each prescribed time; (n−1) correlations are found from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length; (n−2) said degrees of change are found from the (n−1) said correlations, by finding the k-th degree of change based on the k-th correlation and said (k+1)-th said correlation (where k is a natural number of at least 1 and not greater than (n−2)); when m is defined as the number specifying the degree of change that is larger than two degrees of change adjacent to the specified degree of change in the (n−2) degrees of change from the first to the (n−2)-th, namely m satisfying the condition that the m-th degree of change is larger than the (m−1)-th degree of change and is larger than the (m+1)-th degree of change when m is changed one at a time from 2 to (n−3), the defined number m is found; a time range of said prescribed length is specified in accordance with the defined number m; said input voice signal is partitioned into a plurality of sections in accordance with said specified time ranges; characteristic quantities are calculated for each section of the partitioned voice signals; said phonemes of said sections are specified by comparing said characteristic quantities with reference data for each said phoneme; and images corresponding to said phonemes of said sections are displayed, being changed over in a manner that is matched with said sections.

According to an eighth aspect of the present invention, the above objects are achieved by providing a voice analysis program which is executable by a computer comprising a CPU and detects boundaries of phonemes from input voice, the program causes the CPU to execute: a first step specifying a time-point in said input voice signal; a second step extracting the voice signal contained in a time range of prescribed length from said time-point; and a third step decomposing said extracted voice signal into frequency component data, wherein n frequency component data extracted from the voice signal contained in n time ranges of said prescribed length are found by repeating said first, second and third steps by said CPU n times (where n is a natural number of at least 6) for each prescribed time; (n−1) correlations are found from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length; (n−2) said degrees of change are found from the (n−1) said correlations, by finding the k-th degree of change based on the k-th correlation and said (k+1)-th said correlation (where k is a natural number of at least 1 and not greater than (n−2)); when m is defined as the number specifying the degree of change that is larger than two degrees of change adjacent to the specified degree of change in the (n−2) degrees of change from the first to the (n−2)-th, namely m satisfying the condition that the m-th degree of change is larger than the (m−1)-th degree of change and is larger than the (m+1)-th degree of change when m is changed one at a time from 2 to (n−3), the defined number m is found; a time range of said prescribed length is specified in accordance with the defined number m; and said input voice signal is partitioned by said CPU into a plurality of sections in accordance with said specified time ranges.

According to a ninth aspect of the present invention, the above objects are achieved by providing a voice analysis program according to the eighth aspect, further causes the CPU to execute: calculating characteristic quantities for each section of the partitioned voice signals and specifying said phonemes of said sections by comparing said characteristic quantities with reference data for each said phoneme.

According to a tenth aspect of the present invention, the above objects are achieved by providing a voice analysis program according to the ninth aspect wherein the prescribed time is shifted for the time range of said prescribed length to form mutual overlapping portions; said correlation is a value obtained by summing the products of amplitudes corresponding to the same frequency components; said frequency component data is found by Fourier transformation of said extracted frequency components of the voice signal; and said characteristic quantities are determined in accordance with an amplitude of each frequency component obtained by Fourier transformation of said voice signal contained in the section of said partitioned voice signal.

According to an eleventh aspect of the present invention, the above objects are achieved by providing an animation image generating program which is executable by a computer comprising a CPU and displays an image corresponding to partitions of phonemes from an input voice signal, said program causes the CPU to execute: a first step specifying a time-point in said input voice signal; a second step extracting the voice signal contained in a time range of prescribed length from said time-point; and a third step decomposing said extracted voice signal into frequency component data, wherein n frequency component data extracted from the voice signal contained in n time ranges of said prescribed length are found by repeating said first, second and third steps n times (where n is a natural number of at least 6) for each prescribed time; (n−1) correlations are found from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length; (n−2) said degrees of change are found from the (n−1) said correlations, by finding the k-th degree of change based on the k-th correlation and said (k+1)- th said correlation (where k is a natural number of at least 1 and not greater than (n−2)); when m is defined as the number specifying the degree of change that is larger than two degrees of change adjacent to the specified degree of change in the (n−2) degrees of change from the first to the (n−2)-th, namely m satisfying the condition that the m-th degree of change is larger than the (m−1)-th degree of change and is larger than the (m+1)-th degree of change when m is changed one at a time from 2 to (n−3), the defined number m is found; a time range of said prescribed length is specified in accordance with the defined number m; said input voice signal is partitioned into a plurality of sections in accordance with said specified time ranges; characteristic quantities are calculated for each section of the partitioned voice signals; said phonemes of said sections are specified by comparing said characteristic quantities with reference data for each said phoneme; and images corresponding to said phonemes of said sections are displayed, being changed over in a manner that is matched with said sections.

According to a twelfth aspect of the present invention, the above objects are achieved by providing a storage medium that stores a program according to any of the eighth aspect to the twelfth aspect.

According to a thirteenth aspect of the present invention, the above objects are achieved by providing a voice analysis device includes: a frequency decomposition unit that finds n frequency component data extracted from a voice signal contained in n time ranges of prescribed length by repeating n times (where n is a natural number of at least 6), at prescribed intervals, to specify a time-point in an input voice signal, to extract a voice signal contained in a time range of the prescribed length from said time-point and to decompose of said extracted voice signal into frequency component data; a degree of change calculation unit that finds (n−1) correlations from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length, and that finds (n−2) said degrees of change from the (n−1) said correlations by finding the k-th degree of change based on the k-th correlation and said (k+1)-th said correlation (where k is a natural number of at least 1 and not greater than (n−2)); and a segment determining unit that finds a defined number, the defined number m being defined as the number specifying the degree of change that is larger than two degrees of change adjacent to the specified degree of change in the (n−2) degrees of change from the first to the (n−2)-th, namely the defined number m satisfying the condition that the m-th degree of change is larger than the (m−1)-th degree of change and is larger than the (m+1)-th degree of change when m is changed one at a time from 2 to (n−3), that specifies a time range of said prescribed length in accordance with the defined number m, and that partitions said input voice signal into a plurality of sections in accordance with said specified time ranges.

According to a fourteenth aspect of the present invention, the above objects are achieved by providing an animation image generating device includes: a frequency decomposition unit that finds n frequency component data extracted from a voice signal contained in n time ranges of prescribed length by repeating n times (where n is a natural number of at least 6), at prescribed intervals, to specify a time-point in an input voice signal, to extract a voice signal contained in a time range of the prescribed length from said time-point and to decompose of said extracted voice signal into frequency component data; a degree of change calculation unit that finds (n−1) correlations from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length, and that finds (n−2) said degrees of change from the (n−1) said correlations by finding the k-th degree of change based on the k-th correlation and said (k+1)-th said correlation (where k is a natural number of at least 1 and not greater than (n−2)); a segment determining unit that finds a defined number, the defined number m being defined as the number specifying the degree of change that is larger than two degrees of change adjacent to the specified degree of change in the (n−2) degrees of change from the first to the (n−2)-th, namely the defined number m satisfying the condition that the m-th degree of change is larger than the (m−1)-th degree of change and is larger than the (m+1)-th degree of change when m is changed one at a time from 2 to (n−3), that specifies a time range of said prescribed length in accordance with the defined number m, and that partitions said input voice signal into a plurality of sections in accordance with said specified time ranges; a phoneme extraction unit that specifies the said phonemes of said sections by calculating characteristic quantities for each section of the partitioned voice signal and comparing reference data of each of said phonemes and said characteristic quantities; and an animation display unit that displays images corresponding to said phonemes of said sections, these images being changed over in a manner that is matched with said sections.

By employing the present invention, nimble voice analysis processing can be achieved in real time simply by preparing the results of analysis of input voice of a plurality of subjects beforehand as reference data, without needing to prepare reference patterns for each speaker. Also, since an operation of registering reference patterns for each speaker is not required and the reference pattern need only be prepared once, an indefinitely large number of speakers can be coped with. Furthermore, since a database for storing the reference patterns of each speaker is not required, installation even on an appliance of small storage capacity is possible.

DESCRIPTION OF THE PREFERRED EMBODIMENTS

Embodiments of the present invention are described below with reference to the drawings. However, the technical scope of the present invention is not restricted to such embodiments and extends to the inventions set forth in the patent claims and equivalents thereof.

Figure 1:
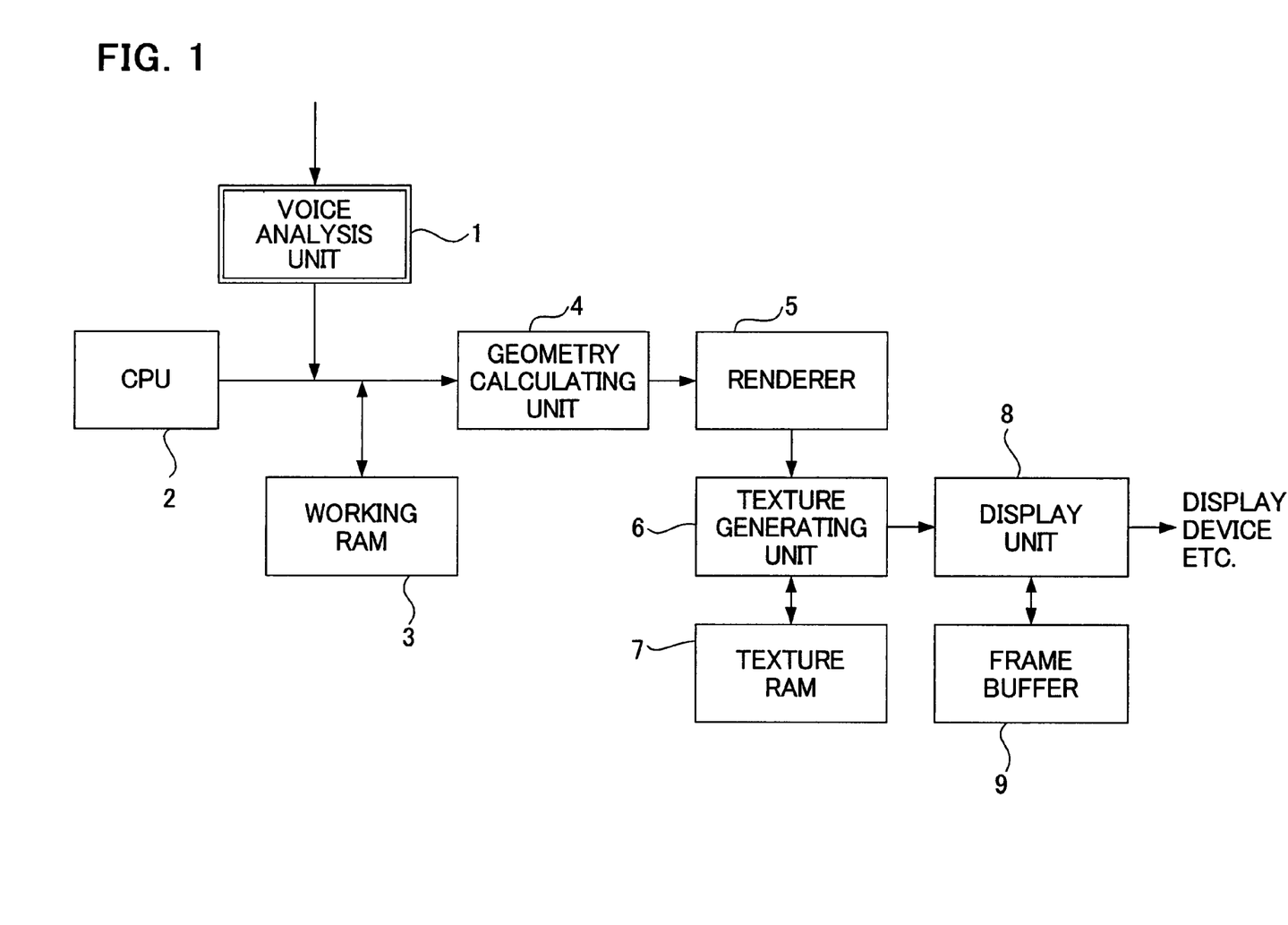
FIG. 1 is a layout block diagram of an image-generating device according to an embodiment of the present invention.

FIG. 1 is a layout block diagram of an image-generating device according to an embodiment of the present invention. This is a lip synch animation generating device that generates an animation corresponding to input voice. An image generating device according to this embodiment includes as a voice analysis unit 1 a voice analysis device according to the present invention and, in addition, having a CPU 2, working RAM 3, a geometry calculating unit 4, renderer 5, texture generating unit 6, texture RAM 7, display unit 8, and frame buffer 9. These functional units are implemented by means of a program that is executed by the CPU (central processing unit) 2 that is provided in the image generating device, but they could also be implemented using hardware.

The CPU 2 controls a program that generates an image. The programs or data used by the CPU 2 are stored in the working RAM 3. The voice analysis unit 1 analyses input voice to extract phonemes included in the input voice and outputs timing information for determining the time of display of an image corresponding to each phoneme.

Under the control of the CPU 2, the geometry calculation unit 4 reads and inputs polygon data composing three-dimensional object data in a world co-ordinate system from the working RAM 3. Next, it performs co-ordinate transformation to data of a viewpoint co-ordinate system whose origin is the point of view. The polygon data that is processed by the geometry calculation unit 4 is input to the renderer 5, where the data in polygon units is converted to pixel unit data.

The pixel unit data is input to the texture-generating unit 6, where texture color is generated in pixel units, based on the texture data stored in the texture RAM 7. The display unit 8 performs hidden face removal processing and/or shading as required on the image data from the texture generating unit 6 and then writes the data to the frame buffer 9 while converting to two-dimensional co-ordinates. The data that is written to the frame buffer 9 is repeatedly read and converted to a video signal that is output. In this way, images corresponding to respective phonemes are changed over and displayed on a display, for example, not shown, in accordance with timing information. The functional block other than the voice analysis unit 1 in FIG. 1 is an animation display unit for displaying animation.

Figure 2:
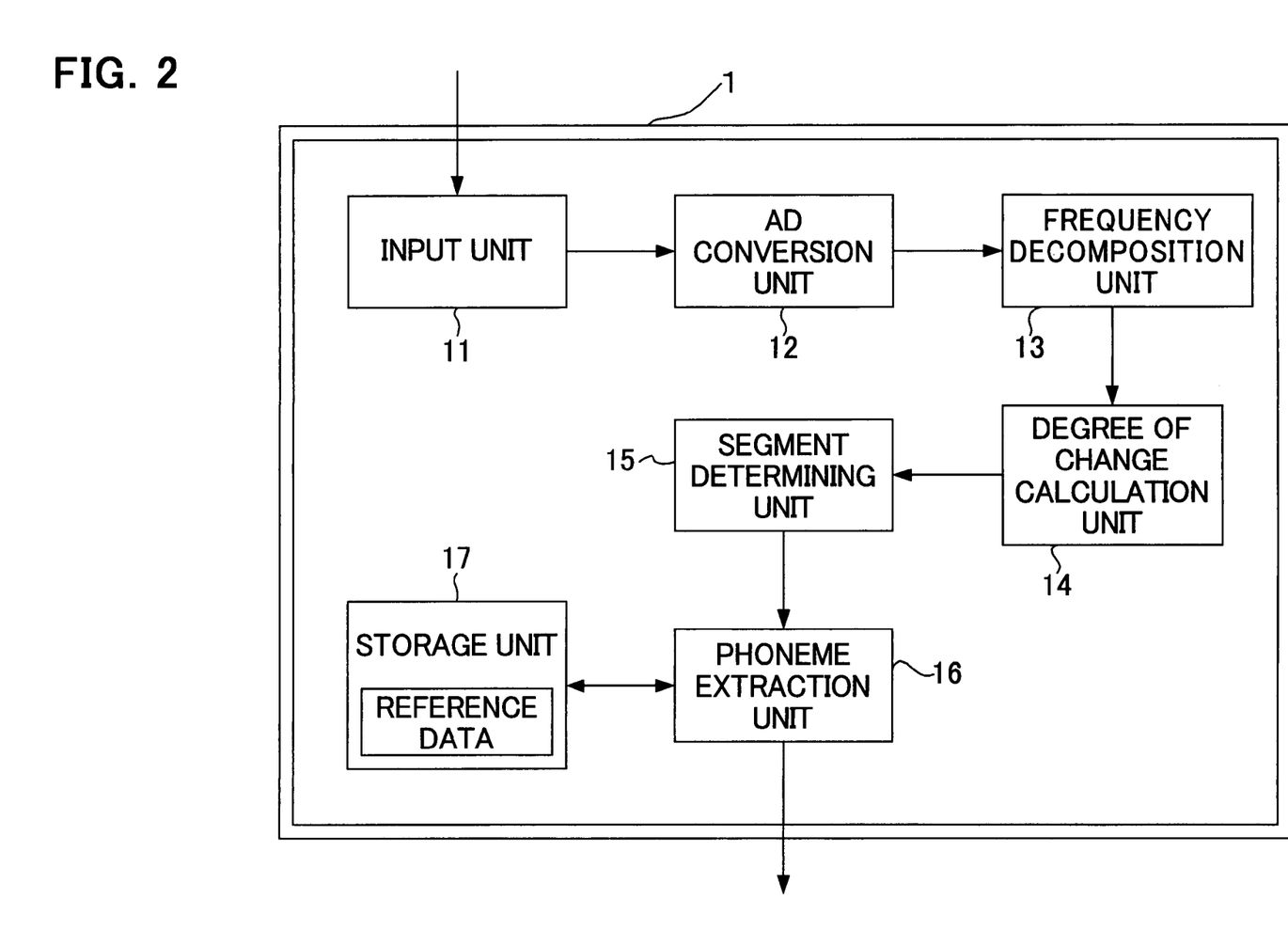
FIG. 2 is a layout block diagram of a voice analysis unit (voice analysis device) according to the present invention.

FIG. 2 is a layout block diagram of a voice analysis unit (voice analysis device) according to the present invention. The voice analysis unit 1 has an input unit 11, AD conversion unit 12, frequency decomposition unit 13, degree of change calculation unit 14, segment determining unit 15, phoneme extraction unit 16 and storage unit 17. These functional units are implemented by means of a program that is executed by the CPU (central processing unit) but they could also be implemented using hardware. Also, regarding the CPU, if a CPU is included in the voice analysis unit 1, the CPU, not shown, included in this voice analysis unit 1 may be employed, or an external CPU (for example CPU 2 of FIG. 1) may also be employed.

The input unit 11 is an interface to which voice is input. Voice input to the voice analysis unit 1 is effected for example by means of an input signal from a microphone or the output signal from an audio appliance connected by an audio cable. In this case, the input unit 11 has respective input terminals for a microphone or audio cable connection. Voice may also be input by means of digital data such as a wave file or mp3 (MPEG-1 Audio Layer 3) file. In this case, the input unit 11 is provided with a connection interface for data transfer (for example a USB (Universal Serial Bus) interface, parallel interface, IEEE (Institute of Electrical and Electronic Engineers) 1394 interface, or internal bus).

If the input voice data is an analog signal, this is converted to digital data by means of an analog/digital (AD) conversion unit 12. The voice data obtained by this digital conversion process is time series data associated with an amplitude at a given time, and is input to a frequency decomposition unit 13. The frequency decomposition unit 13 cuts out successively offset time ranges (called pages) of prescribed length, divides the voice data into a plurality of pages and analyzes the frequency components of each of the pages (using for example discrete Fourier transformation). The pages may also be called frames or voice frames.

The frequency component data for each page is input to the degree of change calculation unit 14, where the degree of change is calculated, based on the correlation (the method of calculation thereof will be described later) between adjacent pages. The calculated degree of change is input to the segment-determining unit 15, where segments, forming intervals for extracting phonemes, are specified in terms of their correlation. These are specified as groups of pages whose segment boundaries (more specifically, their starting positions) are adjacent. The phoneme extraction unit 16 then extracts phonemes, for each segment that has thus been determined, by matching with reference data stored in the storage unit 17. Since segment boundaries are specified as page numbers, when a segment is determined, the timing information of the timing with which phoneme changeover is effected, in other words, timing information for determining the time for which an image corresponding to each phoneme is to be displayed, is thereby obtained.

The reference data stored in the storage unit 17 is reference data obtained by averaging the results obtained by analyzing beforehand the voices of a plurality of subjects in accordance with the procedure in which input voice is analyzed. Thus the voice analysis unit 1 extracts phonemes contained in the input voice and outputs timing information for determining the times at which images corresponding to the phonemes are to be displayed.

Figure 3:
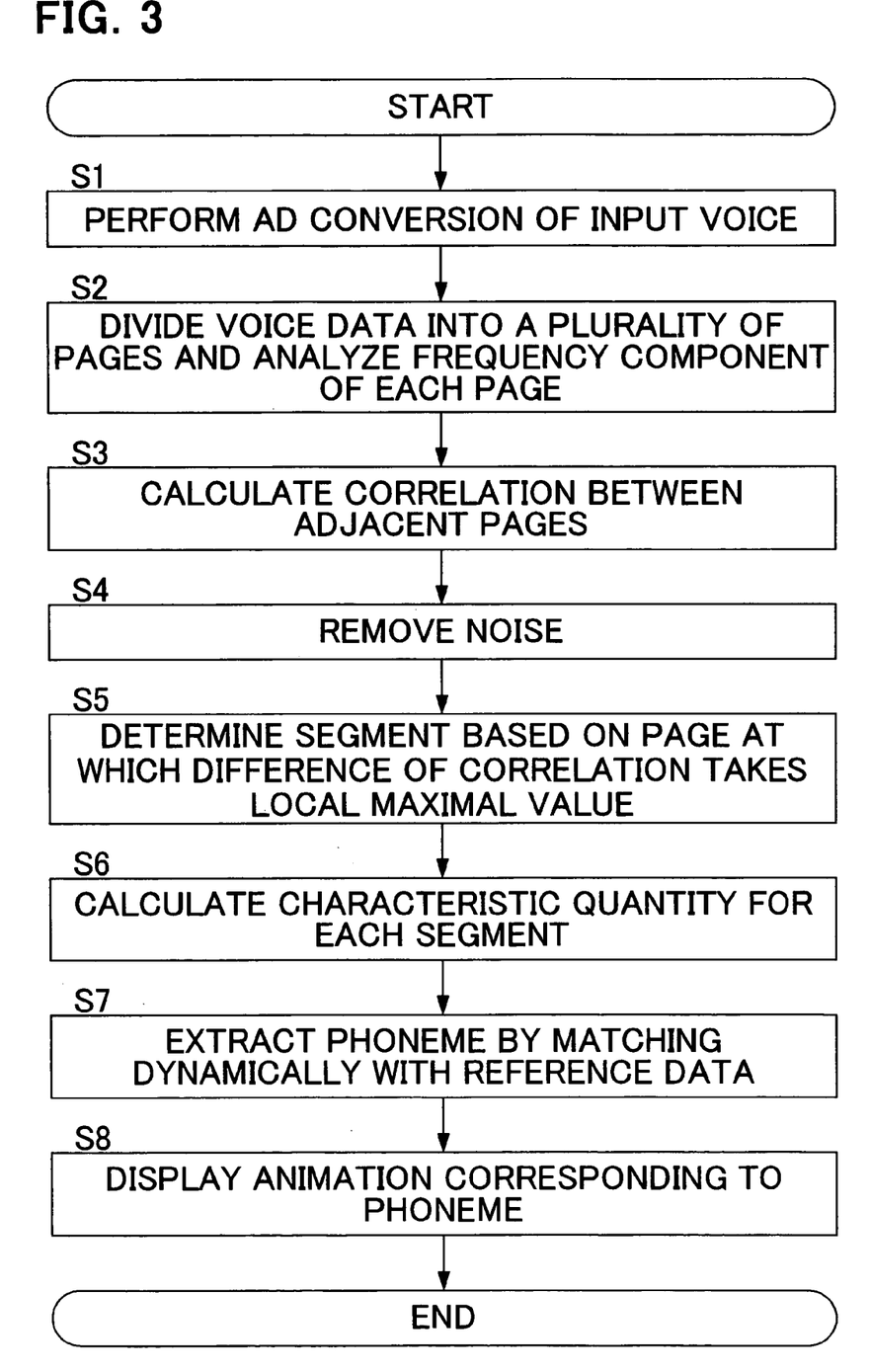
FIG. 3 is a flow chart given in explanation of processing in an image-generating device according to an embodiment of the present invention.

FIG. 3 is a flow chart given in explanation of processing in an image-generating device according to an embodiment of the present invention. Also, FIG. 4 to FIG. 10 are views given in explanation of steps in the flow chart of FIG. 3. FIG. 3 will be described referring to these as appropriate.

First of all, analog/digital (AD) conversion of the input voice is performed (S1). This is performed by inputting the voice that was input through the input unit 11 to the AD conversion unit 12, where the analog signal that was input from for example a microphone is converted to digital data. If the input voice is digital data, the step S1 is omitted.

Next, the frequency decomposition unit 13 divides the voice data into a plurality of pages by cutting out successively offset time ranges (called pages) of prescribed length and analyzes the frequency components of each of the pages (S2). The prescribed length is shorter than the shortest phoneme (about $1/10$ sec). It has been found by experience that sufficient accuracy is obtained if this prescribed length is one-tenth of the shortest phoneme (i.e. about $1/100$ sec). Making the prescribed length shorter than this merely increases the amount of processing, with no benefit. The prescribed length is therefore preferably set to about $1/10$ to $1/100$ sec.

Figure 4:
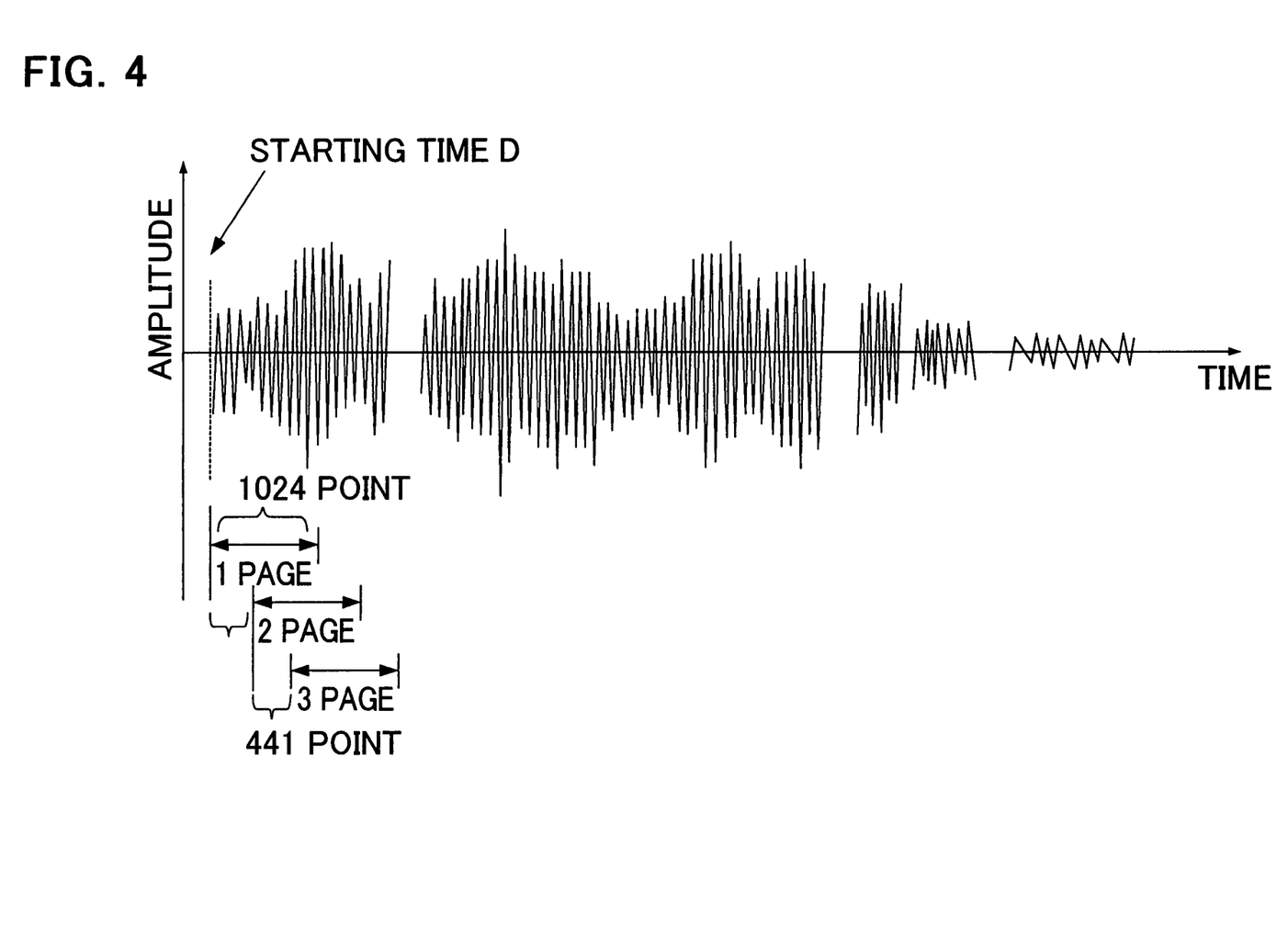
FIG. 4 is a view given in explanation of the page division of step S2 of FIG. 3.

FIG. 4 is a view given in explanation of the page division of step S2 of FIG. 3. The waveform of the input voice is shown by a graph in which time is taken along the horizontal axis and amplitude is taken along the vertical axis. This waveform is divided into a plurality of pages, taking one page as being a time range of prescribed length (in this case, 1024 points, where one point is (1/44100) sec) starting from the starting time-point D (time-point of starting voice input), successively offsetting these pages by 441 points in each case.

It should be noted that although, in this case, the prescribed length was set to 1024 points, this could be suitably altered to take into account for example the sampling frequency of the voice signal or the speed of speaking by the speaker. Also, although, in this case, overlapping portions exist in the time ranges, since the offsetting time is shorter than the time range of prescribed length, a time range of prescribed length could be taken such that there are no overlapping portions.

Figure 5:
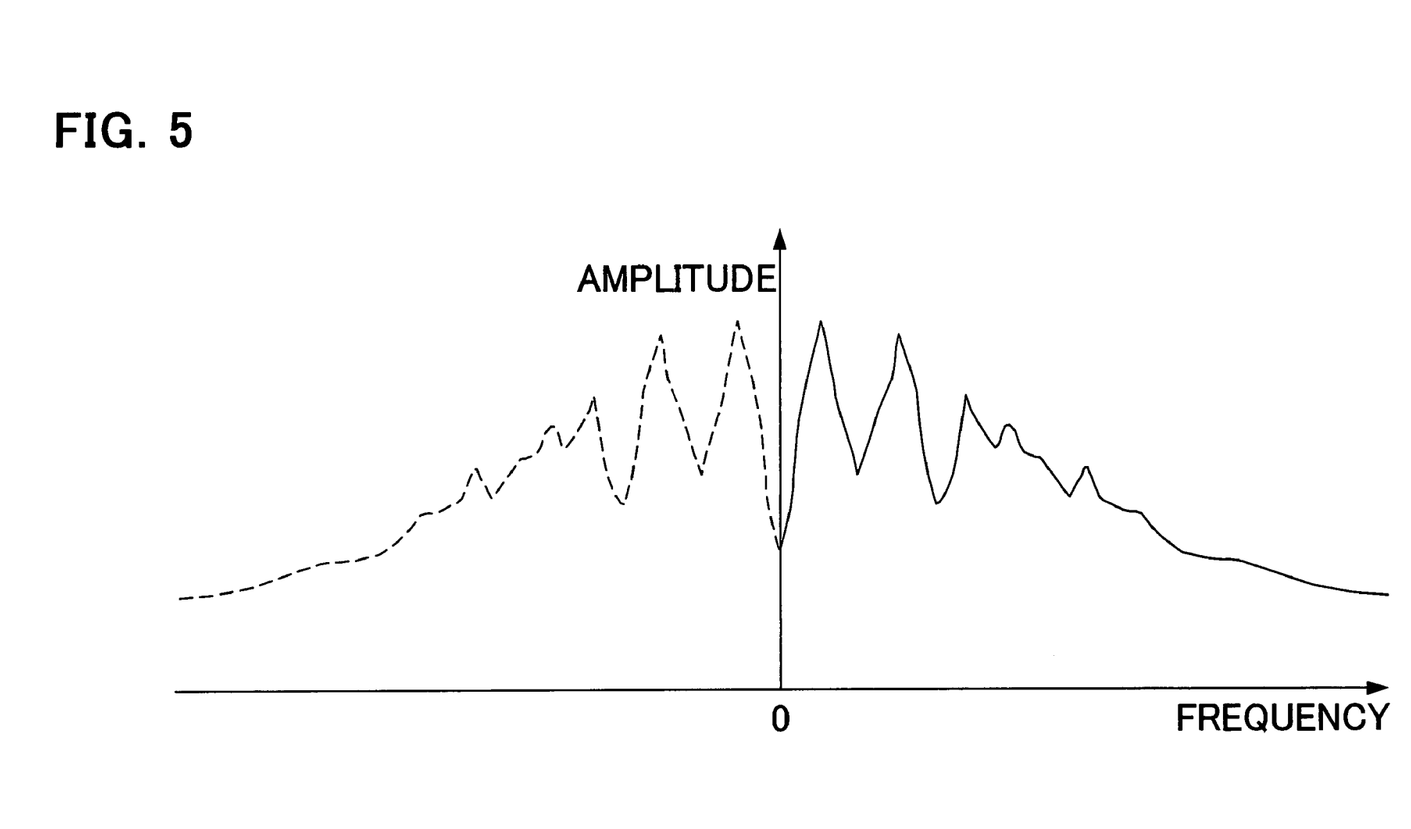
FIG. 5 is a view showing the relationship of frequency and amplitude when analysis of the frequency components of step S2 of FIG. 3 is conducted.

FIG. 5 is a view showing the relationship of frequency and amplitude when analysis of the frequency components of step S2 of FIG. 3 is conducted. This is a view obtained by conducting N-point discrete Fourier transformation on the waveform contained in each page of FIG. 4. Specifically, if the amplitude at a point N in page m is represented by $\{x(m,k) | k=0 \ldots N-1\}$, the discrete Fourier transformation is expressed by the following equation (A).

$$A(m, k) = \frac{1}{N} \sum_{n=0}^{N-1} \omega^{-nk} x(m, k) \text{ where}$$

$$\omega = \cos\frac{2\pi}{N} + i\sin\frac{2\pi}{N}$$

(A)

Since this is symmetrical about the amplitude axis (see FIG. 5), it is sufficient to employ only the positive region of the frequency.

Figure 6:
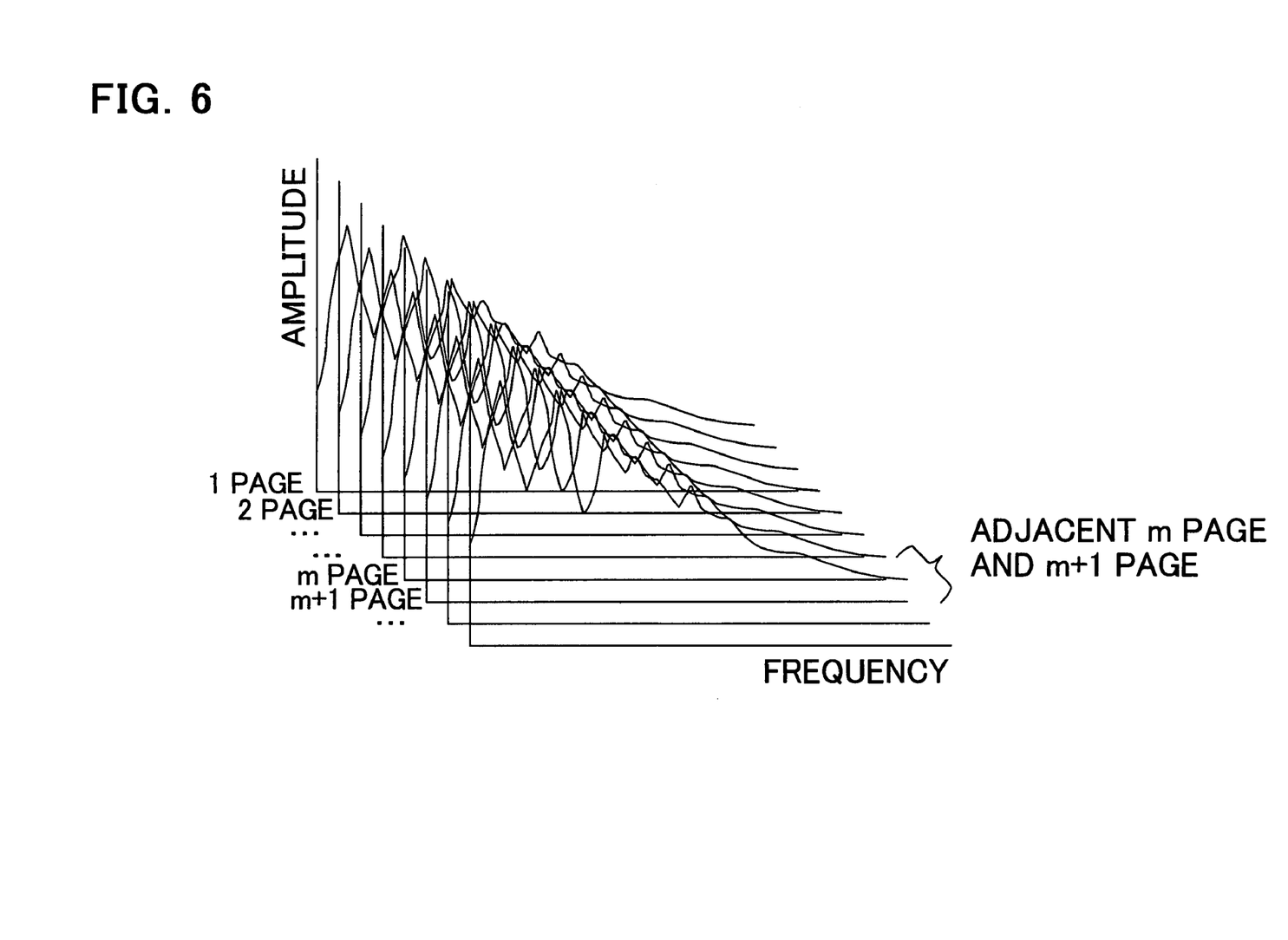
FIG. 6 is a view showing the results of frequency decomposition in respect of a plurality of pages.

FIG. 6 is a view showing the results of frequency decomposition in respect of a plurality of pages. In FIG. 6, for simplicity, frequency component graphs of the same shape are arranged side by side, but, in fact, the frequency component graphs will change for each page, since the input voice waveform differs depending on lapsed time.

The degree of change calculation unit 14 then first of all calculates, using the following equation (B), the correlation between adjacent pages (S3).

$$R(x) = \sum_{n=0}^{N-1} |A(x, n)| \times |A(x+1, n)|$$

(B)

The way in which the correlation is calculated, and the significance of equation (B) will be described using FIG. 7.

Figure 7:
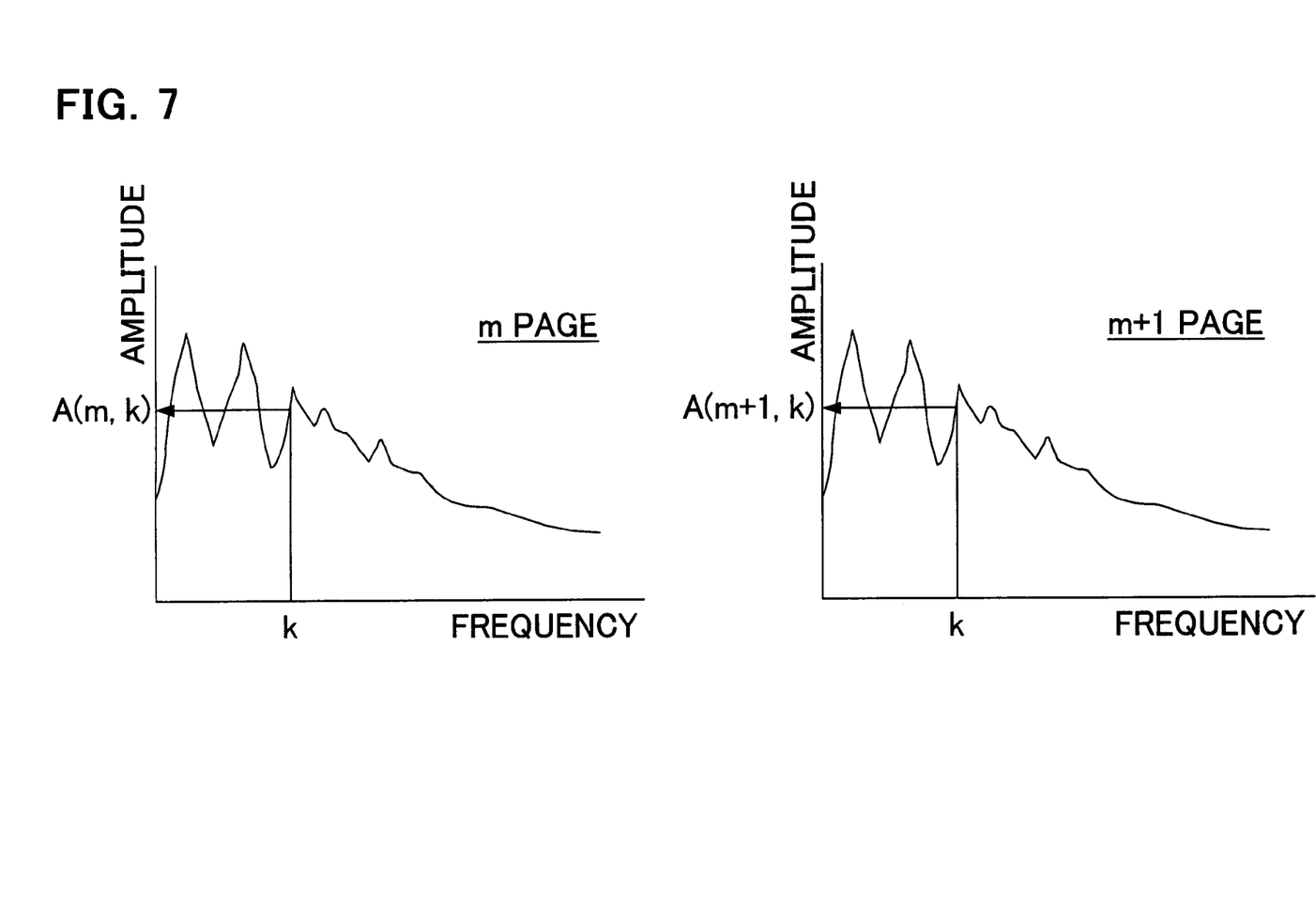
FIG. 7 is a view showing how a calculation of the correlation between adjacent pages is performed.

FIG. 7 is a view showing how a calculation of the correlation between adjacent pages is performed. FIG. 7 is an example of the calculation of the correlation of for example page m and page (m+1) (i.e. in the case where x=m in equation (B)) of the adjacent pages shown in FIG. 6. The correlation is found by taking the sum for N points of the values obtained by multiplying the amplitudes corresponding to the same frequency component in each of the pages. In FIG. 7, first of all, the amplitude A (m, k) of page m and the amplitude A (m+1, k) of page (m+1) corresponding to the same frequency component k are multiplied. The correlation of page m and page (m+1) is calculated by taking the sum while changing k from 0 to N−1.

The degree of change calculation unit 14 then averages the correlation found by equation (B) using the following equation (C) in order to remove noise (S4).

$$Q(x) = \frac{\sum_{k=-x}^{x} R(k+x)}{2x+1}$$

(C)

The less the change in the shape of the graph of the frequency components when the page changes, the smaller is the change in the value of the correlation Q(x) found by equation (C). Conversely, when the shape of the graph of the frequency component changes, there is a large change in the value of the correlation Q(x) compared with the correlation of adjacent and subsequent pages. Thus pages where a change of the graph of the frequency components takes place may be apprehended as defining the locations of boundaries of new phonemes (i.e. segment boundaries). Taking the difference between correlations as the degree of change, a segment may therefore be defined by specifying adjacent pages that satisfy the condition that the degree of change thereat, compared with the previous and following degrees of change, is larger than at both of these (S5). In step S5, the segment determining unit 15 specifies adjacent pages that satisfy the condition given above, from the difference function of the correlations. The correlation Q(x) from which noise has been removed is employed for this purpose. Next, the description will be continued using FIG. 8. The degree of change i.e. the difference of correlations may be expressed by S(y)=Q(y+1)−Q(y).

Figure 8:
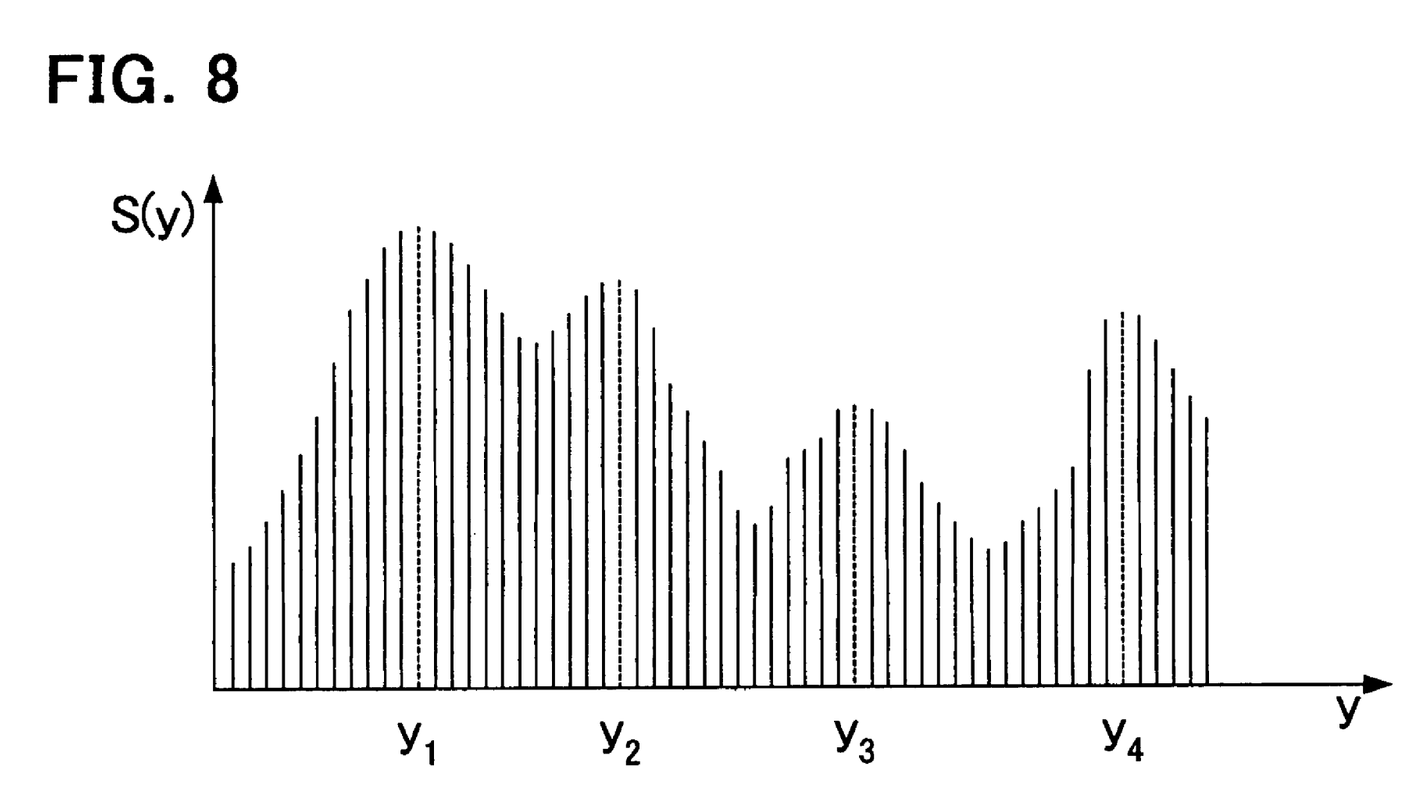
FIG. 8 is a view showing the relationship between a page-linked parameter y and difference S(y) of correlation.

FIG. 8 is a view showing the relationship between a page-linked parameter y and difference S(y) of correlation. What is meant by S(1), corresponding to the page-linked parameter y=1, is a value obtained by subtracting the correlations (Q(1)) of the adjacent first page and second page from the correlation (Q(2)) of the adjacent second page and third page. Although a page cannot be directly specified by the page-linked parameter, a group of adjacent pages specifying a segment boundary is thereby specified.

Groups of adjacent pages corresponding to natural numbers y for which this degree of change S(y) satisfies S(y−1)<S(y) and S(y+1)<S(y) are then specified as the starting positions of phonemes. As described above, the waveform of an input voice changes considerably at locations of phoneme changeover, so locations which show marked changes indicate the starting positions of new phonemes. In the case of FIG. 8, there are four locations where the natural number y satisfies S(y−1)<S(y) and S(y+1)<S(y) (these will be designated respectively as the page-linked parameters $y_1$, $y_2$, $y_3$ and $y_4$), so four phonemes are extracted from the first segment to the fourth segment.

The page-linked parameter $y_1$ indicates the segment starting page to the page $y_1$ or the page $y_1+1$. It does not matter which of these is used. However, in the voice signal being analyzed, these are treated as being the same. The same applies to other page-linked parameters specifying the starting positions of the segments. Next, the phoneme extraction unit 16 calculates a characteristic quantity for each segment determined in step S5 (S6). For example, one typical method of calculating ordinary characteristic quantities is the technique of decomposing the input voice into frequency components in each segment, performing inverse Fourier transformation and then performing a cepstrum analysis. An example thereof is to decompose the input voice into frequency components for each segment and to use the amplitude of these frequency components as characteristic quantities. If segment and page coincide, the results of the frequency decomposition for each page found in step S2 may be employed.

Figure 9:
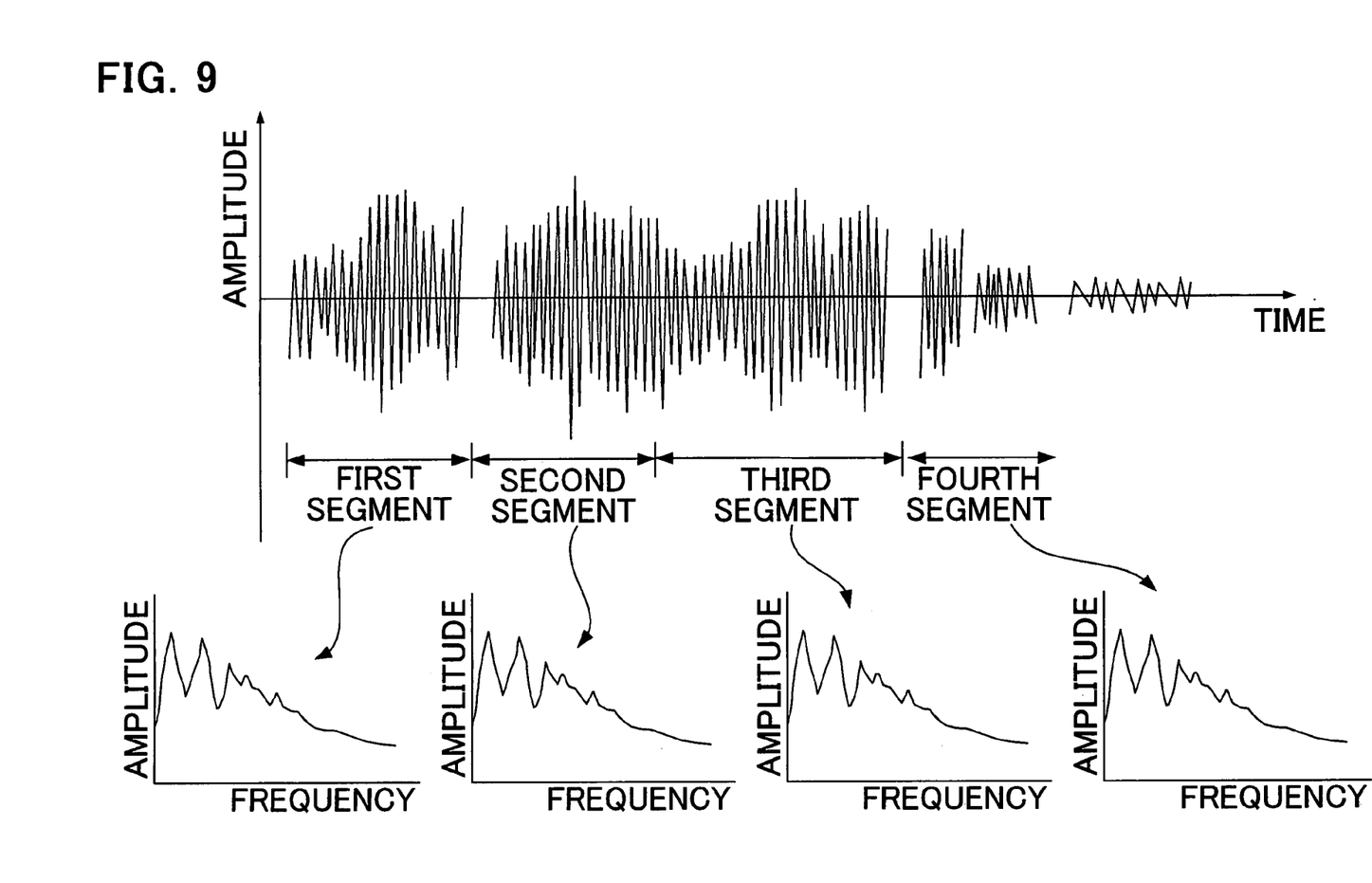
FIG. 9 is a view given in explanation of frequency decomposition for each segment.

FIG. 9 is a view given in explanation of frequency decomposition for each segment. This illustrates how frequency components are calculated by an N-point discrete Fourier transformation for each segment. For simplicity in FIG. 9, frequency component graphs of the same shape are arranged side by side, but, in fact, the frequency component graphs will change for each page, since the input voice waveform differs depending on lapsed time.

Next, phonemes are extracted by matching with reference data (S7). As the reference data, data are employed obtained by averaging the results of executing the procedure from the above step S1 to S6 in respect of a plurality of subjects beforehand. Once such reference data has been created and stored in the storage unit 17, stable phoneme extraction can be achieved irrespective of subsequent changes of user: in particular, application to an indefinitely large number of users is possible. Regarding the method of matching, well-known techniques such as DP matching can be applied.

By means of the processing from the above step S1 to S7, segments and phonemes and the pages of segment boundaries contained in the input voice can be specified. Also, if the pages of segment boundaries are specified, in the present embodiment, extraction of timing information is also completed, since conversion to a time-point can be achieved using {starting time-point D+product of 441 points and (page of segment boundary−1)}. Animation is then displayed corresponding to the phoneme, in accordance with the layout described in FIG. 1, using the phoneme and timing information that is output from the voice analysis unit 1 (S8).

Figure 10:
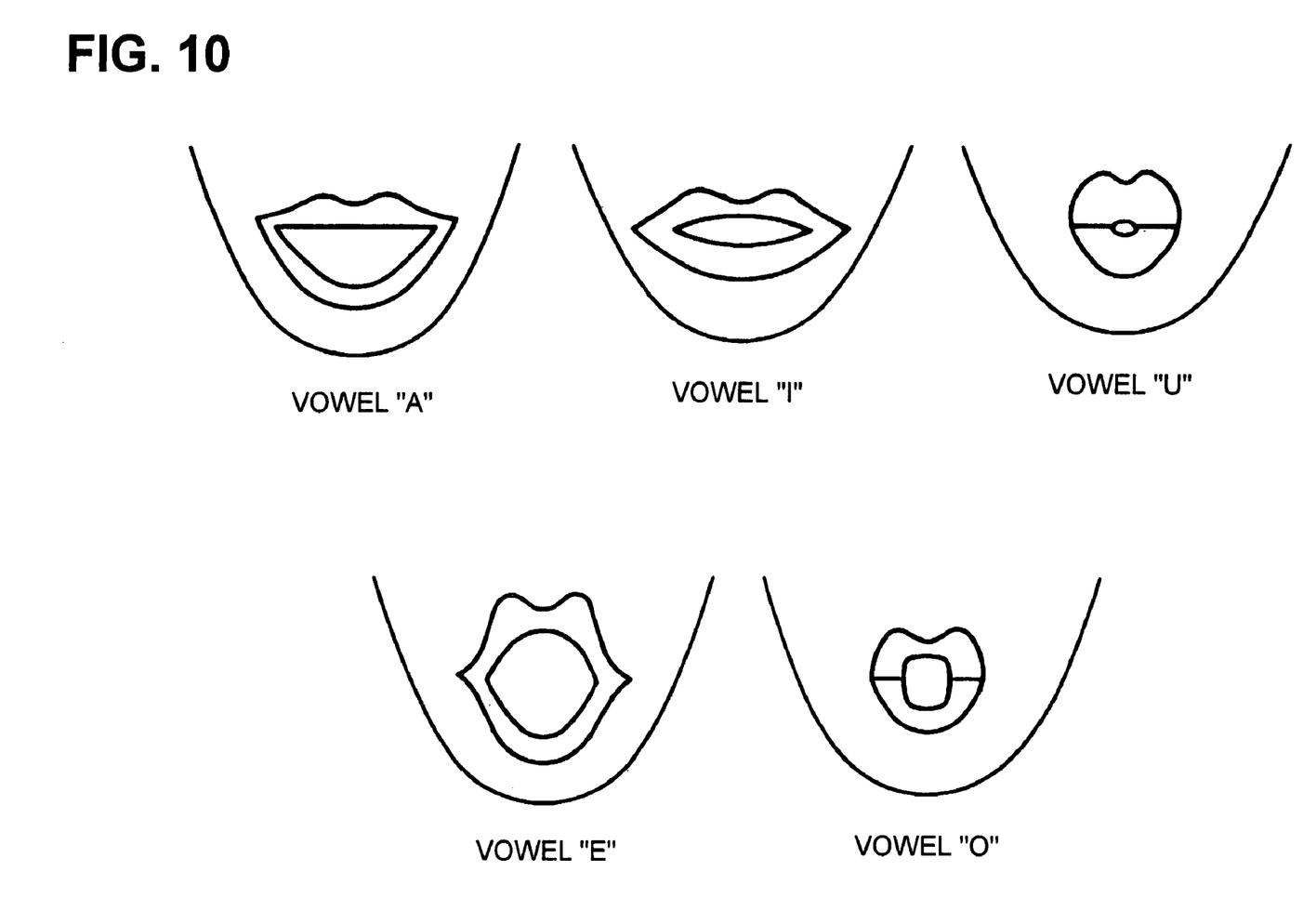
FIG. 10 is a view given in explanation of animation corresponding to phonemes.

FIG. 10 is a view given in explanation of animation corresponding to phonemes. Assuming that, for example, files are selected as the extracted phonemes and reference data for each vowel is stored in the storage unit 17, if data corresponding to animation for each vowel shown in FIG. 10 is stored in the working RAM 3, animation can be displayed corresponding to each vowel contained in the input voice by using the image generating device of FIG. 1. For example, animation images corresponding to each vowel can be displayed by associating the image "a" in FIG. 10 with the vowel "a" and associating the image "i" in FIG. 10 with the vowel "i".

As described above, with this embodiment of the present invention, nimble voice analysis processing can be achieved in real time simply by preparing the results of analysis of input voice of a plurality of subjects beforehand as reference data, without needing to prepare reference patterns for each speaker. Also, since an operation of registering reference patterns for each speaker is not required and the reference pattern need only be prepared once, an indefinitely large number of speakers can be coped with. Furthermore, since a database for storing the reference patterns of each speaker is not required, installation even on an appliance of small storage capacity is possible.

Examples of possible applications include animation for online chat rooms, animation in video games (in particular video games that are played in conversational mode, or role-playing games) or unmanned reception systems employed in hospitals or financial institutions etc.

It should be noted that, although, in this embodiment, a method was described which was implemented as an image generating device, implementation would also possible as a method or program processed in accordance with the flow chart shown in FIG. 3. Furthermore, although, in this embodiment, a method was described which was implemented as an image generating device, application would also be possible for example to a voice/letter conversion device whereby letters corresponding to phonemes are displayed. In this case, the functional block that displays animation in the layout of FIG. 1 (functional block other than the voice analysis unit 1 in FIG. 1) is replaced by a functional block that displays letters and the step S8 (flow chart of FIG. 3) whereby animation is displayed may be changed so as to display letters. Also, although, in this embodiment, a method was described of implementation as an image generating device including a voice analysis unit 1, implementation of the voice analysis unit as an independent device (voice analysis device) would also be possible. In this case, the step S8 of the flow chart shown in FIG. 3 is dispensed with and the phoneme or timing information that is output from the voice analysis device is made use of by processing on a separate device that is connected thereto.

What is claimed is:

1. A computer-executable method of voice analysis which detects boundaries of phonemes from input voice, comprising:

a first step specifying a time-point in said input voice signal;

a second step extracting the voice signal contained in a time range prescribed length from said time-point; and a third step of decomposing said extracted voice signal into frequency component data, wherein n frequency component data extracted from the voice signal contained in n time ranges of said prescribed length are found by repeating said first, second and third steps n times (where n is a natural number of at least 6) for each prescribed time;

(n−1) correlations are found from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length;

(n−2) degrees of change are found from the (n−1) said correlations, by finding the k-th degree of change based on the k-th correlation and said (k+1)-th said correlation (where k is a natural number of at least 1 and not greater than (n−2));

when m is defined as the number specifying the degree of change that is larger than two degrees of change adjacent to the specified degree of change in the (n−2) degrees of change from the first to the (n−2)-th, namely m satisfying the condition that the m-th degree of change is larger than the (m−1)-th degree of change and is larger than the (m+1)-th degree of change when m is changed one at a time from 2 to (n−3), the defined number m is found;

a time range of said prescribed length is specified in accordance with the defined number m; and said input voice signal is partitioned into a plurality of sections in accordance with said specified time ranges.

2. The method of voice analysis according to claim 1, wherein said frequency component data is found by Fourier transformation of frequency components of said extracted voice signal.

3. The method of voice analysis according to claim 1, wherein the prescribed time is shifted for the time range of said prescribed length to form mutual overlapping portions.

4. The method of voice analysis according to claim 1, wherein said correlation is a value obtained by summing the products of amplitudes corresponding to the same frequency components.

5. The method of voice analysis according to claim 1, further comprising:
    calculating characteristic quantities for each section of said partitioned voice signals and
    specifying said phonemes of said sections by comparing said characteristic quantities with reference data for each said phoneme.

6. The method of voice analysis according to claim 5, wherein said characteristic quantities are determined in accordance with an amplitude of each frequency component obtained by Fourier transformation of said voice signal contained in the section of said partitioned voice signal.

7. A computer-executable method of animation image generation which displays an image corresponding to partitions of phonemes from an input voice signal, comprising:
    a first step specifying a time-point in said input voice signal;
    a second step extracting the voice signal contained in a time range of prescribed length from said time-point; and
    a third step decomposing said extracted voice signal into frequency component data, wherein
    n frequency component data extracted from the voice signal contained in n time ranges of aid prescribed length are found by repeating said first, second and third steps n times (where n is a natural number of at least 6) for each prescribed time;
    (n−1) correlations are found from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length;
    (n−2) degrees of change are found from the (n−1) said correlations, by finding the k-th degree of change based on the k-th correlation and said (k+1)-th said correlation (where k is a natural number of at least 1 and not greater than (n−2));
    when m is defined as the number specifying the degree of change that is larger than two degrees of change adjacent to the specified degree of change in the (n−2) degrees of change from the first to the (n−2)-th, namely m satisfying the condition that the m-th degree of change is larger than the (m−1)-th degree of change and is larger than the (m+1)-th degree of change when m is changed one at a time from 2 to (n−3), the defined number m is found;
    a time range of said prescribed length is specified in accordance with the defined number m;
    said input voice signal is partitioned into a plurality of sections in accordance with said specified time ranges;
    characteristic quantities are calculated for each section of the partitioned voice signals;
    said phonemes of said sections are specified by comparing said characteristic quantities with reference data for each said phoneme; and
    images corresponding to said phonemes of said sections are displayed, being changed over in a manner that is matched with said sections.

8. A storage medium storing a voice analysis program which is executable by a computer for detecting boundaries of phonemes from input voice, wherein said program when executed by the computer causes the computer to perform:
    a first step of specifying a time-point in said input voice signal;
    a second step of extracting the voice signal contained in a time range of prescribed length from said time-point; and
    a third step of decomposing said extracted voice signal into frequency component data, wherein
    n frequency component data extracted from the voice signal contained in n time ranges of said prescribed length are found by repeating said first, second and third steps by said CPU n times (where n is a natural number of at least 6) for each prescribed time;
    (n−1) correlations are found from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length;
    (n−2) degrees of change are found from the (n−1) said correlations, by finding the k-th degree of change based on the k-th correlation and said (k+1)-th said correlation (where k is a natural number of at least 1 and not greater than (n−2));
    when m is defined as the number specifying the degree of change that is larger than two degrees of change adjacent to the specified degree of change in the (n−2) degrees of change from the first to the (n−2)-th, namely m satisfying the condition that the m-th degree of change is larger than the (m−1)-th degree of change and is larger than the (m+1)-th degree of change when m is changed one at a time from 2 to (n−3), the defined number m is found;
    a time range of said prescribed length is specified in accordance with the defined number m; and
    said input voice signal is partitioned by said CPU into a plurality of sections in accordance with said specified time ranges.

9. The storage medium of claim 8, wherein when said program is executed by the computer, the computer further performs:
    calculating characteristic quantities for each section of the partitioned voice signals; and
    specifying said phonemes of said sections by comparing said characteristic quantities with reference data for each said phoneme.

10. The storage medium of claim 9,
    wherein the prescribed time is shifted for the time range of said prescribed length to form mutual overlapping portions;
    said correlation is a value obtained by summing the products of amplitudes corresponding to the same frequency components;
    said frequency component data is found by Fourier transformation of said extracted frequency components of the voice signal; and
    said characteristic quantities are determined in accordance with an amplitude of each frequency component obtained by Fourier transformation of said voice signal contained in the section of said partitioned voice signal.

11. A storage medium storing an animation image generating program which is executable by a computer for displaying an image corresponding to partitions of phonemes from an input voice signal, wherein said program when executed by said computer causes the computer to perform:
    a first step specifying a time-point in said input voice signal;
    a second step extracting the voice signal contained in a time range of prescribed length from said time-point; and a third step decomposing said extracted voice signal into frequency component data, wherein n frequency component data extracted from the voice signal contained in n time ranges of said prescribed length are found by repeating said first, second and third steps n times (where n is a natural number of at least 6) for each prescribed time;

(n−1) correlations are found from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length;

(n−2) degrees of change are found from the (n−1) said correlations, by finding the k-th degree of change based on the k-th correlation and said (k+1)-th said correlation (where k is a natural number of at least 1 and not greater than (n−2));

when m is defined as the number specifying the degree of change that is larger than two degrees of change adjacent to the specified degree of change in the (n−2) degrees of change from the first to the (n−2)-th, namely m satisfying the condition that the m-th degree of change is larger than the (m−1)-th degree of change and is larger than the (m+1)-th degree of change when m is changed one at a time from 2 to (n−3), the defined number m is found;

a time range of said prescribed length is specified in accordance with the defined number m;

said input voice signal is partitioned into a plurality of sections in accordance with said specified time ranges;

characteristic quantities are calculated for each section of the partitioned voice signals;

said phonemes of said sections are specified by comparing said characteristic quantities with reference data for each said phoneme; and images corresponding to said phonemes of said sections are displayed, being changed over in a manner that is matched with said sections.

12. An animation image generating device comprising:
a processor to execute a program to perform as:
  a frequency decomposition unit that finds n frequency component data extracted from a voice signal contained in n time ranges of prescribed length by repeating n times (where n is a natural number of at least 6), at prescribed intervals, to specify a time-point in an input voice signal, to extract a voice signal contained in a time range of the prescribed length from said time-point and to decompose of said extracted voice signal into frequency component data;
  a degree of change calculation unit that finds (n−1) correlations from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length, and that finds (n−2) said degrees of change from the (n−1) said correlations by finding the k-th degree of change based on the k-th correlation and said (k+1)-th said correlation (where k is a natural number of at least 1 and not greater than (n−2));
  a segment determining unit that finds a defined number, the defined number m being defined as the number specifying the degree of change that is larger than two degrees of change adjacent to the specified degree of change in the (n−2) degrees of change from the first to the (n−2)-th, namely the defined number m satisfying the condition that the m-th degree of change is larger than the (m−1)-th degree of change and is larger than the (m+1)-th degree of change when m is changed one at a time from 2 to (n−3), that specifies a time range of said prescribed length in accordance with the defined number m, and that partitions said input voice signal into a plurality of sections in accordance with said specified time ranges; and
  a phoneme extraction unit that specifies the said phonemes of said sections by calculating characteristic quantities for each section of the partitioned voice signal and comparing reference data of each of said phonemes and said characteristic quantities; and
  an animation display unit to display images corresponding to said phonemes of said sections, these images being changed over in a manner that is matched with said sections.

13. A voice analysis device comprising:
a processor to execute a program to perform as:
  a frequency decomposition unit that finds n frequency component data extracted from a voice signal contained in n time ranges of prescribed length by repeating n times (where n is a natural number of at least 6), at prescribed intervals, to specify a time-point in an input voice signal, to extract a voice signal contained in a time range of the prescribed length from said time-point and to decompose of said extracted voice signal into frequency component data;
  a degree of change calculation unit that finds (n−1) correlations from n said frequency component data by obtaining i-th correlation (where i is a natural number of at least 1 and no more than (n−1)) based on the i-th item of said frequency component data and the (i+1)-th item of said frequency component data corresponding to said voice signal contained in mutually adjacent time ranges of said prescribed length, and that finds (n−2) said degrees of change from the (n−1) said correlations by finding the k-th degree of change based on the k-th correlation and said (k+1)-th said correlation (where k is a natural number of at least 1 and not greater than (n−2)); and
  a segment determining unit that finds a defined number, the defined number m being defined as the number specifying the degree of change that is larger than two degrees of change adjacent to the specified degree of change in the (n−2) degrees of change from the first to the (n−2)-th, namely the defined number m satisfying the condition that the m-th degree of change is larger than the (m−1)-th degree of change and is larger than the (m+1)-th degree of change when m is changed one at a time from 2 to (n−3), that specifies a time range of said prescribed length in accordance with the defined number m, and that partitions said input voice signal into a plurality of sections in accordance with said specified time ranges.

* * * * *